United States Patent [19]

Meacham

[11] Patent Number: 4,935,773
[45] Date of Patent: Jun. 19, 1990

[54] VACUUM BLANKET

[75] Inventor: G. B. Kirby Meacham, Shaker Heights, Ohio

[73] Assignee: Honeywell Inc., Minneapolis, Minn.

[21] Appl. No.: 353,055

[22] Filed: May 17, 1989

[51] Int. Cl.⁵ ............................................. G03B 27/20
[52] U.S. Cl. .......................................... 355/92; 355/94
[58] Field of Search ...................................... 355/91–94

[56] References Cited

U.S. PATENT DOCUMENTS

| | | | |
|---|---|---|---|
| 3,119,318 | 1/1964 | Forester et al. | 355/94 |
| 3,507,593 | 4/1970 | McTeague | 355/91 X |
| 4,423,851 | 1/1984 | Heitman | 355/91 X |
| 4,484,813 | 11/1984 | Maher et al. | 355/94 X |
| 4,551,016 | 11/1985 | Maher et al. | 355/91 |
| 4,619,526 | 10/1986 | Hougaard | 355/91 X |
| 4,669,870 | 6/1987 | Fosh | 355/91 |
| 4,704,028 | 11/1987 | Richards, Jr. | 355/92 |

Primary Examiner—Richard A. Wintercorn
Attorney, Agent, or Firm—Roger W. Jensen

[57] ABSTRACT

A vacuum blanket for holding a sensitive sheet of material in precise registration with a film master against a rigid transparent plate includes a blanket of thin, flexible material having at least one vacuum port therein and an inside face opposing the rigid plate and adapted for biasing the sensitive sheet and film master toward the rigid plate in precise registration with one another. A flexible perimeter seal is provided around the edges of the blanket for sealing off a vacuum chamber established between the blanket and the plate when air is withdrawn through the vacuum port. A bladder of thin, flexible sheet material is secured to the outer surface of the blanket with a plurality of spaced apart seams forming a plurality of separate, inflatable air chambers on the outside surface of the blanket. An inflation port is provided in the bladder for directing air under pressure to inflate the air chambers and thereby create a plurality of induced bleed passages formed along the plurality of seams by a slight amount of movement of the blanket, sensitive sheet and film master away from the rigid plate. The bleed passages aid in rapidly evacuating the entire surface area of the vacuum chamber when air is initially withdrawn through the vacuum port and the bleed passages are then diminished when pressurized air is exhausted so that the sheets are pressed flat and held tightly in registration against the glass plate during an exposure cycle.

24 Claims, 5 Drawing Sheets

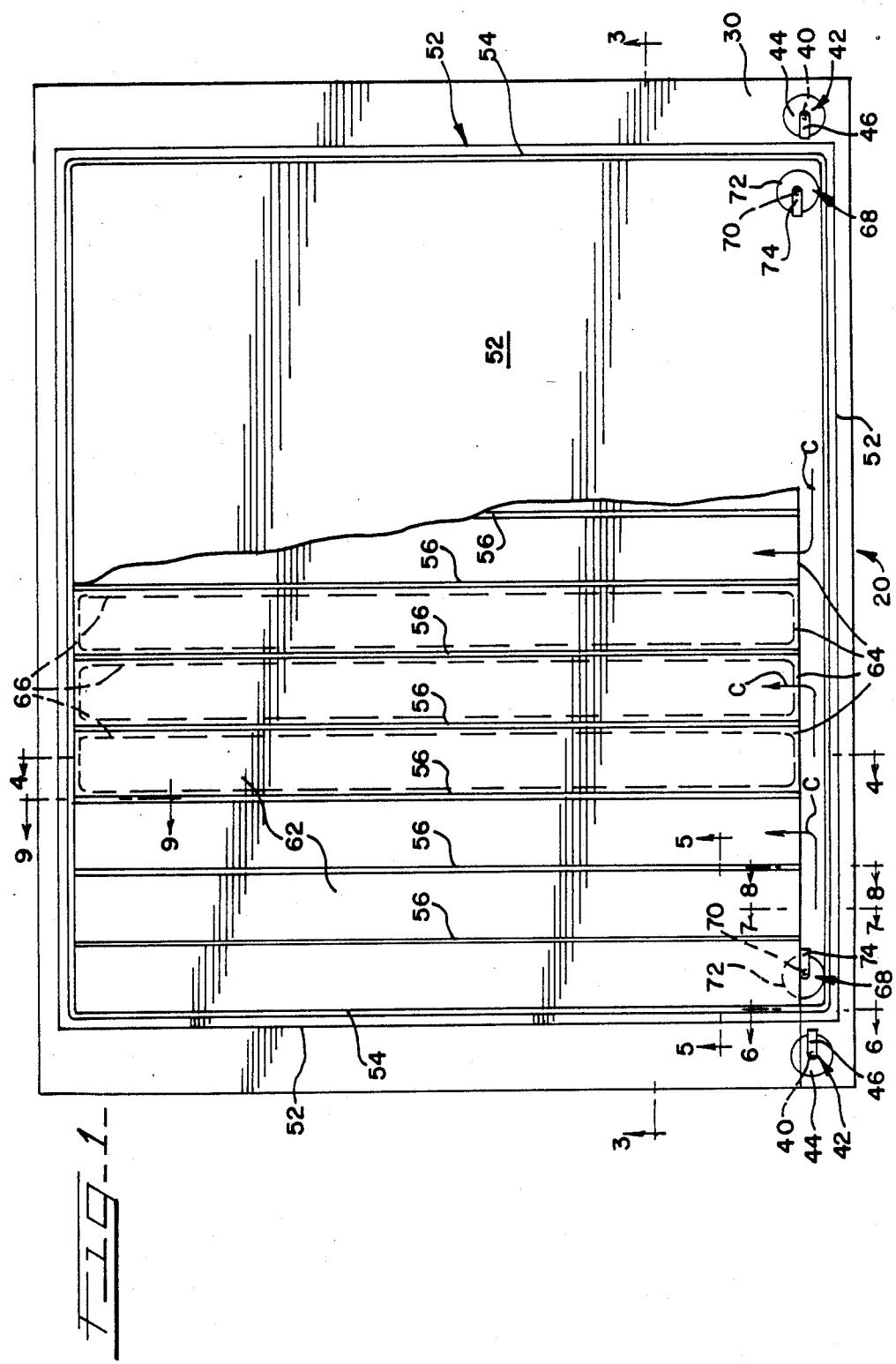

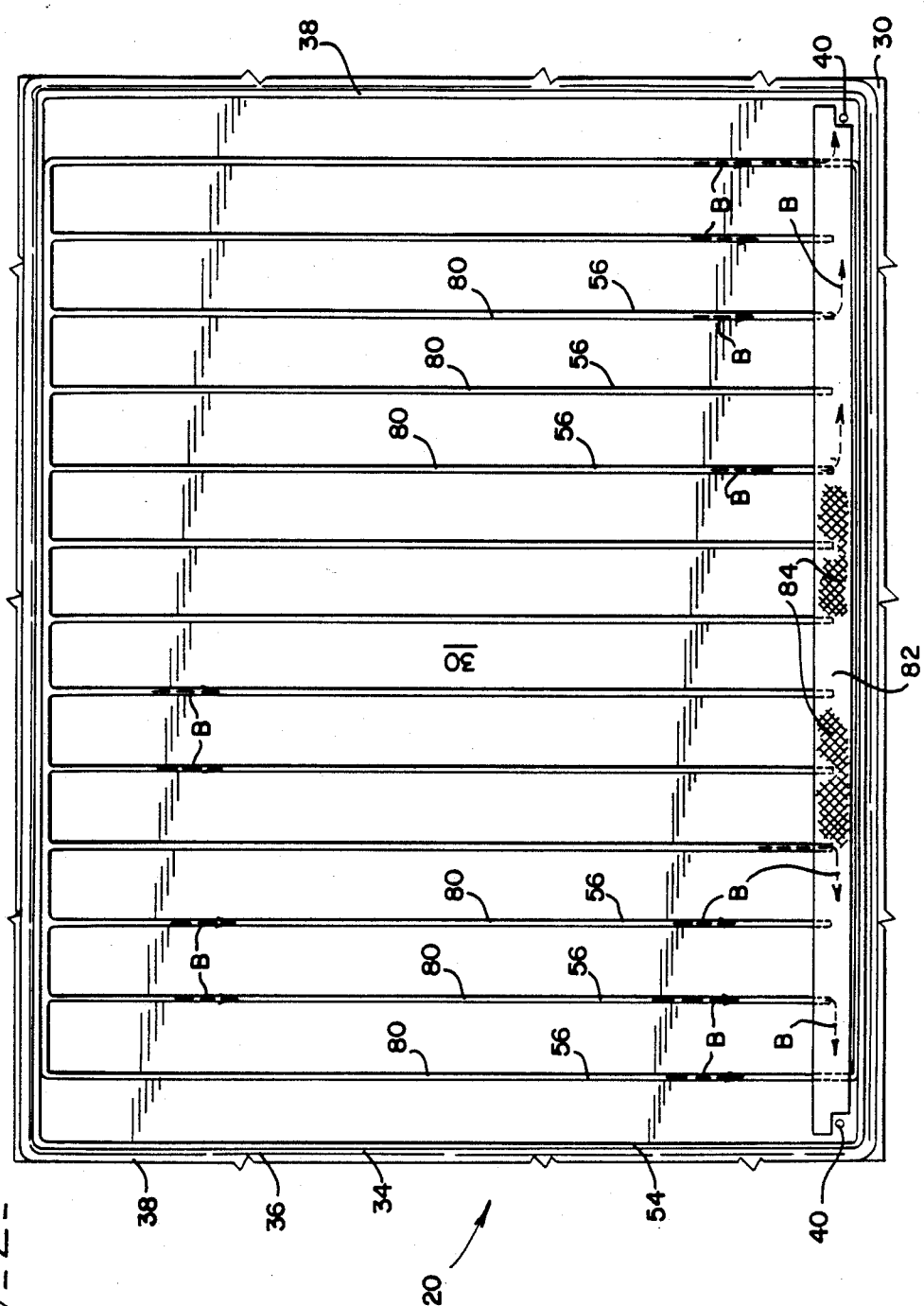

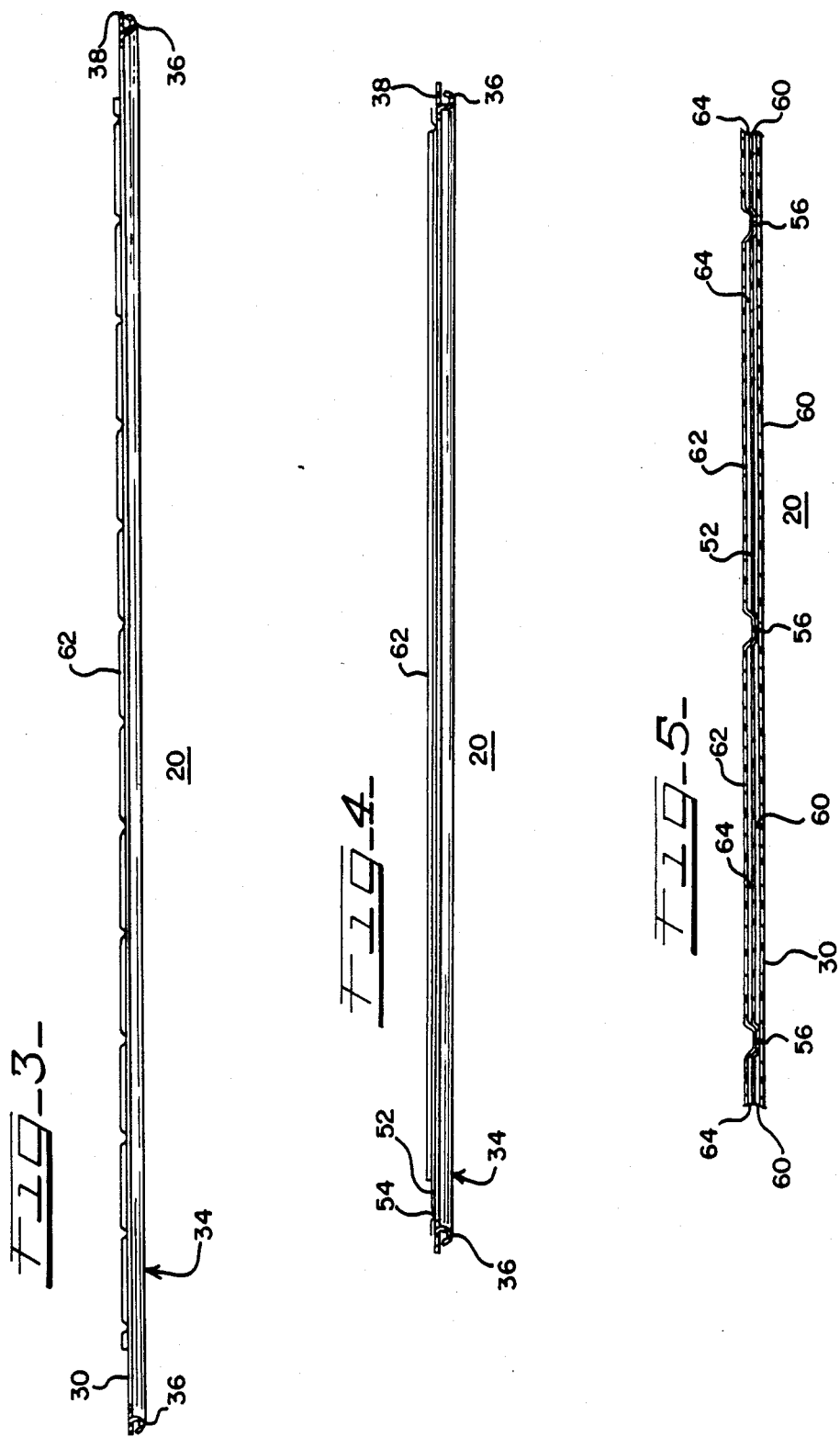

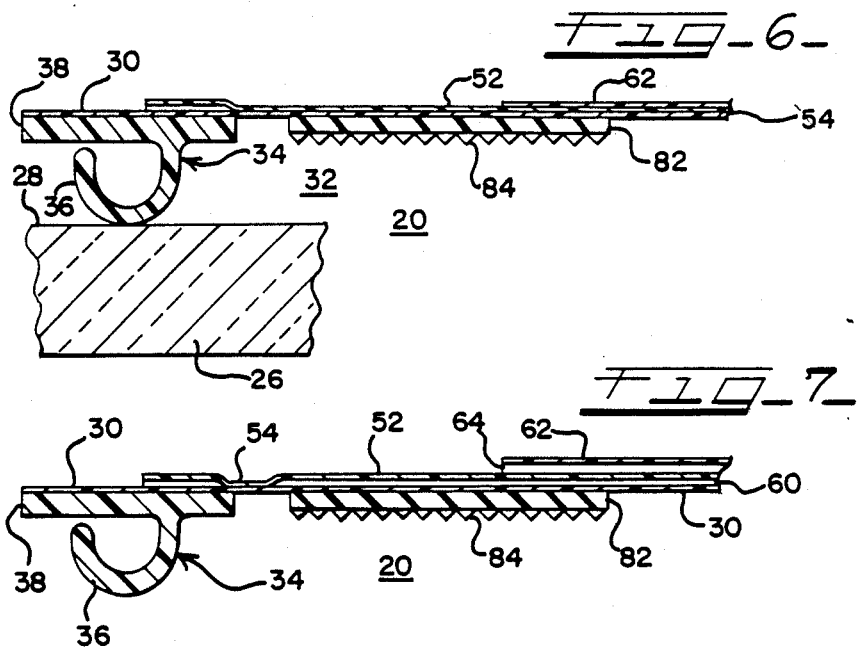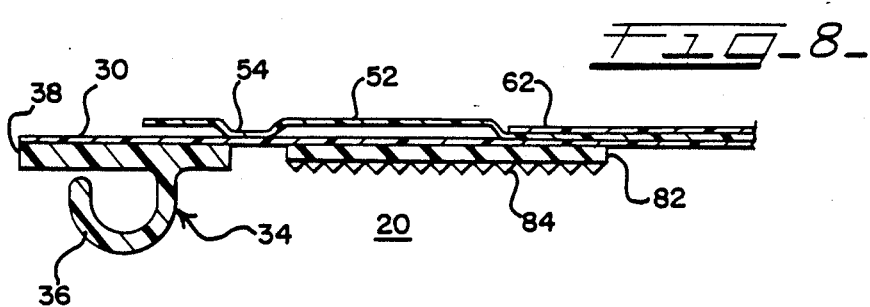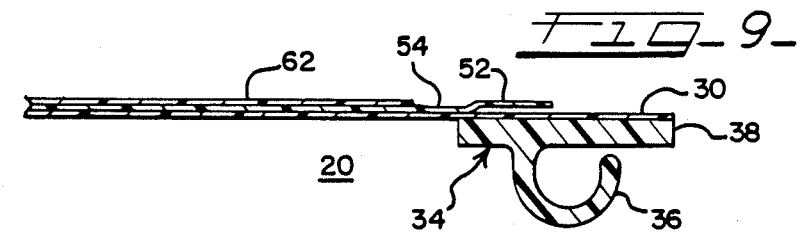

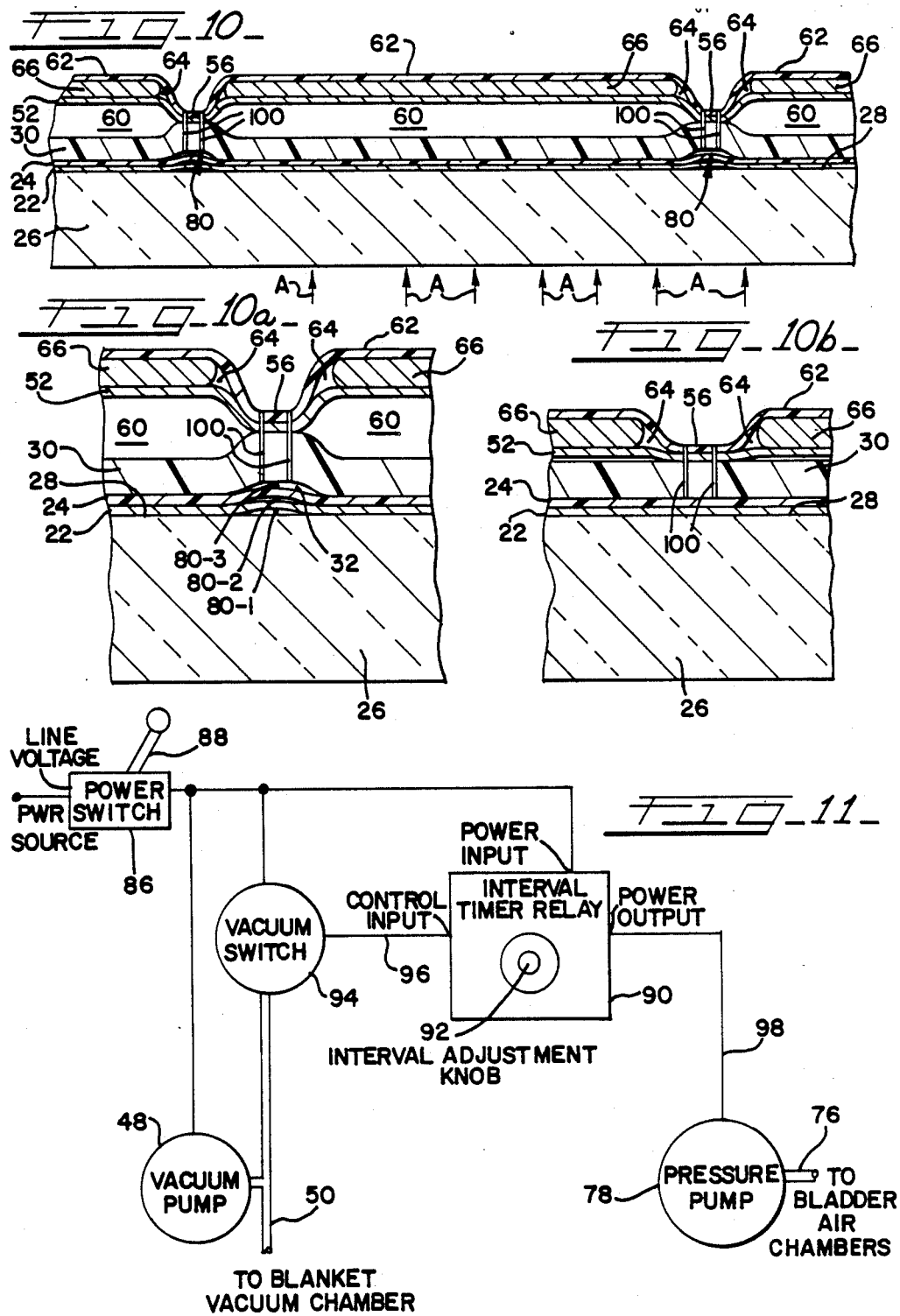

VACUUM BLANKET

BACKGROUND OF THE INVENTION

1. Field of the Invention

The present invention relates to vacuum blankets and more particularly, to vacuum blankets of the type used for holding a pre-sensitized sheet of film material in precise registration with a film master against a flat, transparent, rigid plate for controlled light exposure to form a pattern or image on the pre-sensitized sheet of film.

2. Description of the Prior Art

Various types of vacuum contact systems and blankets have been developed for use in the graphic arts and one such vacuum contact system is shown in the Fosh Patent No. 4,669,870. German Patent No. 29 28 320 C2 discloses a vacuum blanket having crisscrossed grooves for facilitating air removal from the central portion of the blanket when a vacuum is drawn. German Patent No. 31 22 707 A1 discloses a blanket backed up by a mechanical roller system for eliminating entrapped air. Maher et al U.S. Pat. No. 4,551,016 discloses a vacuum printer wherein a spring biased floating plate is used to back up a flexible blanket and Maher et al Patent No. 4,484,813 discloses a system wherein a perforated rigid plate backs up a flexible blanket.

Problems have been present with many types of vacuum blankets because of air pockets remaining between film sheets when a vacuum is drawn and often-times a vacuum blanket temporarily seals around the periphery first, making it difficult to remove interior air pockets even though a high vacuum is drawn on the space between a rigid plate of glass or transparent sheet material and the pre-sensitized and master film sheets.

Many vacuum blankets of the prior art require an exceptionally long interval of time to insure the complete removal of such air pockets and this results in a much slower operating speed with attendant higher costs for the production of graphic arts materials.

In many prior art systems the registration between a film master and a pre-sensitized sheet has been less than precision due to the presence of small air pockets and/or ridges commonly formed while evacuating the air existing between the film media sheets. As shown in the aforementioned patents, some units have used mechanical means such as springs, rollers, etc., to press the media sheets together into registration against a transparent rigid surface. Some systems require an elaborate and expensive control system for providing variable levels of vacuum in different zones over the face of the film sheets. Even such complex systems have still been subject to the aforementioned difficulties and have been costly to produce and relatively slow in operation with attendently a lower grade or quality of reproductions.

OBJECTS OF THE INVENTION

It is an object of the present invention to provide a new and improved vacuum blanket for use in graphic arts processes and more particularly, a new and improved vacuum blanket which eliminates or minimizes the aforementioned problems of prior systems.

More particularly, it is an object of the invention to provide a new and improved vacuum blanket which provides for high quality, precise registration between a film master sheet and a pre-sensitized sheet in juxtaposition therewith and a blanket which is capable of rapidly eliminating any air pockets and void spaces between the film sheets at a relatively fast operating speed or short time cycle of operation.

Yet another object of the present invention is to provide a new and improved vacuum blanket of the character described which is relatively low in cost, extremely reliable in operation and one which assures a high quality product every time.

Still another object of the present invention is to provide a new and improved vacuum blanket of the character described which uses both a vacuum principle for assuring precise film master registration along with positively pressurized air chambers for assisting in the rapid removal of any air entrapped between confronting faces of the film materials involved.

Another object of the present invention is to provide a new and improved vacuum blanket of the character described wherein a plurality of interiorly positioned induced bleed passages are formed momentarily when the vacuumizing process is initiated to insure that all of the air is rapidly removed from between confronting faces of the film sheets, thereby producing a high quality registration between a film master and a pre-sensitized copy sheet.

BRIEF SUMMARY OF THE INVENTION

The foregoing and other objects and advantages of the present invention are accomplished in a preferred embodiment described herein comprising a new and improved vacuum blanket for holding a presensitized film medium in precise registration with a film master against a transparent, glass or plastic, rigid exposure plate. The vacuum blanket includes an inner sheet or blanket of thin, flexible sheet material having at least one vacuum port therein and an inside face opposing the rigid exposure plate and adapted for biasing the pre-sensitized film sheet and the master image film sheet toward the rigid plate when a vacuum is induced by withdrawing air through the vacuum port. A flexible perimeter seal is provided around the edge of the inner blanket for sealing off a vacuum chamber between the blanket and the rigid plate when air is withdrawn through the vacuum port. A bladder of thin, flexible sheet material is attached to an outer surface of the blanket along spaced apart, parallel seams forming a plurality of separate, inflatable air chambers on the outside of the inner blanket.

At least one inflation port is provided in the bladder for directing pressurized air to inflate the air chambers and thereby create a plurality of induced bleed passages which are momentarily formed along the seams of attachment by a slight movement of the inner blanket and the film sheets away from the planar surface of the rigid exposure plate. This pulling away action of the inner blanket sheet forms a plurality of parallel interior passageways for rapidly evacuating the vacuum chamber or space defined between the film sheets and the rigid plate when air is withdrawn by a vacuum pump. Shortly after an operating vacuum pump is initially connected to the vacuum ports on the inner blanket sheet, pressurized air is introduced into the plurality of inflatable air chambers on the outer or back side of the inner blanket and this action assists the evacuation process in the vacuum chamber momentarily by establishing the plurality of induced bleed passages along the seams between the film sheets and the inner blanket and rigid exposure plate. Thereafter, the inflatable air chambers are also evacuated and atmospheric air pressure is effective to bias both the bladder sheet and the inner blanket of flexible material toward the rigid exposure plate while the copying process takes place. After a selected exposure interval, the vacuum chamber between the inner blanket and rigid plate is again filled with atmospheric air pressure to release the peripheral seal and the film sheets are then readily removed from the space between the inner blanket sheet and the rigid exposure plate.

BRIEF DESCRIPTION OF THE DRAWING

For a better understanding of the present invention, reference should be had to the following detailed description, taken in conjunction with the drawings, in which:

FIG. 1 is a top plan view of a new and improved vacuum blanket constructed in accordance with the features of the present invention and shown from a back or outside face with a portion of an outer bladder sheet broken away to indicate the arrangement of spaced apart, parallel seams;

FIG. 2 is a bottom plan view of an inside face of the vacuum blanket of FIG. 1;

FIG. 3 is a longitudinal cross-sectional view of the vacuum blanket taken substantially along lines 3—3 of FIG. 1;

FIG. 4 is a transverse cross-sectional view of the vacuum blanket taken substantially along lines 4—4 of FIG. 1;

FIG. 5 is an enlarged, fragmentary, cross-sectional view of the vacuum blanket taken substantially along lines 5—5 of FIG. 1;

FIG. 6 is a greatly enlarged, fragmentary, cross-sectional view of the vacuum blanket taken substantially along lines 6—6 of FIG. 1;

FIG 7 is a fragmentary cross-sectional view of the vacuum blanket taken substantially along lines 7—7 of FIG. 1;

FIG. 8 is a fragmentary cross-sectional view of the vacuum blanket taken substantially along lines 8—8 of FIG. 1;

FIG. 9 is a greatly enlarged fragmentary cross-sectional view of the ,vacuum, blanket taken substantially along lines 9—9 of FIG. 1;

FIGS. 10 and 10a are greatly enlarged, fragmentary, cross-sectional views similar to FIG. 5, but illustrating the vacuum blanket in an initial operative condition wherein induced bleed passages are momentarily established by inflation of individual air chambers on the back side of the vacuum blanket;

FIG. 10b is a greatly enlarged, fragmentary, transverse cross-sectional view similar to FIGS. 10 and 10a illustrating the vacuum blanket in an operative condition wherein the individual positive air pressure chambers on the back side of the blanket have been deflated; and FIG. 11 is a diagrammatic view illustrating an electrical/pneumatic control system of the vacuum blanket in accordance with the features of the present invention.

DESCRIPTION OF A PREFERRED EMBODIMENT OF THE INVENTION

Referring now more particularly to the drawings, therein is illustrated a new and improved vacuum blanket 20 constructed in accordance with the features of the present invention and especially designed and adapted for use in graphic arts for making images on media such as a thin film of pre-sensitized, flexible, sheet material 24 maintained in close precisely aligned registration with a film image master 22, also of thin flexible sheet material. Exposure of the sheet 24 is obtained by precisely timed exposure to light passing from an external source of light through a rigid plate 26 of glass or transparent plastic having a planar surface 28 as best shown in FIGS. 10, 10a and 10b.

In accordance with the present invention, the vacuum blanket 20 includes an inner layer or blanket 30 formed of thin, flexible, strong, resilient sheet material such as a vinyl or urethane plastic coated woven fabric. As illustrated in FIGS. 1 and 2, the vinyl or urethane coated inner blanket 30 is generally rectangular in shape and is dimensioned in accordance with the largest size of media or film sheets 22 and 24 that are to be used. The inner blanket 30 is impervious to the passage of air or gas therethrough and has a thickness or weight per square foot, flexibility, resiliency, and strength characteristics to provide for a large number of repetitive operational cycles wherein the blanket is momentarily deflected away from a precise planar configuration and then returned to a precisely flattened or planar condition for positively biasing the master image film sheet 24 and the pre-sensitized film sheet 22 toward the planar surface 28 of the glass plate 26 of a graphic arts plate maker and the like (not shown).

In order to evacuate the space and establish a vacuum chamber 32 (FIG. 6) in an area defined between an inside surface of the inner vacuum sheet 30 and the planar surface 28 of the rigid glass plate 26, as best illustrated in FIGS. 6 and 10, the vacuum blanket 20 is provided with a peripheral, flexible, vacuum sealing strip 34 having a generally rectangular outline around the peripheral edge of the inner blanket 30. The sealing strip 34 has a J-shaped transverse cross-section as shown in FIGS. 6 through 9 and includes a flexible sealing lip 36 adapted to seal tightly against the planar surface 28 of the glass plate 26 as shown in FIG. 6. In addition, the peripheral sealing strip 34 includes a flat, base portion 38 which is adhesively secured to the inside face of the vinyl or urethane coated inner vacuum blanket 30 as best shown in FIGS. through 9.

For the purpose of evacuating air from the space 32, the inner blanket 30 is provided with a plurality of vacuum ports 40 (FIG. 2) located at corner portions as best shown in FIG. 2. Each vacuum port 40 is provided with a surrounding vacuum outlet fitting 42 having a circular base 44 adhesively or otherwise sealed and secured to an outside surface of the inner blanket 30. The fitting 42 includes a vacuum outlet conduit 46 in direct communication with the hole or port 40 in the flexible vacuum blanket 30. Preferably, the vacuum outlet fittings 42 are formed of integrally molded, resilient plastic material such as rubber or vinyl and the circular bases 44 of the fittings are sealingly secured to the surface of the flexible inner blanket 30 to provide an airtight seal around the associated vacuum port 40.

When a vacuum source such as a vacuum pump 48 is connected to the outlet conduits 46 of the outlet fittings 42 via a flexible conduit 50 (FIG. 11), air within the space or vacuum chamber 32 between the flexible blanket 30 and the planar surface 28 of the fixed glass plate 26 is rapidly withdrawn and the vacuum blanket 20 is deflected inwardly toward the surface 28 by virtue of atmospheric pressure acting on the outside surface of the vacuum blanket 20. At the same time this action occurs, the J-shaped deflectable sealing lip 36 around the periphery of the vacuum blanket 20 is pressed tightly against the planar surface 28 of the glass block 26 to form an airtight seal so that the vacuum chamber 32 is rapidly evacuated when the vacuum pump 48 is running.

As the vacuum chamber or space 32 is evacuated, the flexible inner blanket sheet 30 biases the pre-sensitized media film sheet 24 and the film master image sheet 22 tightly against the planar surface 28 to provide a continuous and precise registration between the film master and the media sheet as long as the vacuum is maintained. Subsequently, controlled light from an external source such as an arc light of a plate maker or other device is illuminated for a precise period of time and this light as indicated by the arrows A in FIG. 10 passes through the film master sheet 22 to form an image on the pre-sensitized film sheet 24. After the desired time interval of light exposure, the light source is turned off and the presensitized sheet material 24 has an image formed thereon precisely corresponding to the image present on the film master sheet 22.

In accordance with the present invention, the vacuum blanket 20 includes an outer bladder 52 formed of of thin, flexible, resilient, sheet material comprising a woven fabric covered with vinyl and/or urethane plastic material. The bladder sheet 52 has a thickness somewhat less than that of the inner blanket sheet 30 as best shown in FIGS. 10, 10a and 10b, and is secured to an outside face of the inner blanket sheet along a rectangular-shaped outline or perimeter sealing strip 54 (FIGS. 1 and 7-9) forming a large, rectangular air pocket on the back side of the inner blanket sheet 30. Preferably, the rectangular, peripheral sealing strip 54 comprises a strip formed by heat sealing such as radio-frequency heat sealing, vulcanizing, and/or adhesive material that is compatible with the vinyl or urethane covering on the woven fabric sheets 30 and 52 to provide a strong, airtight seal.

In addition to the peripheral sealing strip 54 between the back or outside surface of the inner blanket 30 and the inner face of the bladder sheet 52, there is also formed a plurality of separate, elongated, parallel seams 56 which divide the surface area of the bladder sheet 52 into a plurality of smaller, rectangular-shaped, elongated air pressure chambers 60.

In order to limit the outward deflection of the bladder sheet 52 in the regions between each pair of adjacent, elongated, parallel seams 56 when the pressure chambers 60 are inflated, an outer sheet 62 of thin, flexible, resilient plastic material is secured to the outside surface of the bladder 52 along the outside face of the parallel seams 56 thereby creating a plurality of outer batten pockets 64. Each pocket is adapted for containing an elongated, relatively thin stiff batten 66 formed of aluminum or hard plastic material and slipped longitudinally into the pockets 64 from the open ends thereof. The outer sheet 62 may also comprise a vinyl or urethane coated woven fabric like the inner blanket 30 and the bladder 52. The outer sheet 62 is usually joined to the outside surface of the bladder 52 along the seam areas 56 by heat sealing or adhesives to provide a strong and relatively stiff seam or joint. The battens 66 may be formed of a variety of materials such as 1/16" thick aluminum or a relatively stiff, hard plastic material that is generally similar to battens of a sailboat.

As illustrated in FIGS. 1 and 2, the space or region between the bladder 52 and the inner blanket 30 is supplied with pressurized air through one or more inlet fittings 68 in coaxial alignment with inlet ports 70 (FIG. 2). These ports direct pressurized air into the plurality of elongated, parallel, pressure inflatable, separate, air chambers 60. Each inlet fitting includes a circular base 72 adhesively or heat sealed to the surface of the bladder 52 around a pressure inlet port 70 and an inlet conduit 74 connected to a flexible pressure line 76 supplied with pressurized air from a pressure pump 78 as shown in the diagram of FIG. 11.

The relatively rigid battens 66 when inserted into the batten pockets 64 provide stiffness for the outer walls of the pressure chambers 60 so that when the chambers are inflated with air at 3 to 5 psi above atmospheric pressure by the pump 78, the opposite flexible walls of each chamber tends to form a generally symmetrical, transverse cross-section as illustrated in FIGS. 10 and 10a. As each individual pressure chamber 60 is inflated, a small portion of the inner vacuum blanket 30 is pulled away from the rigid glass plate 26 along the seam areas 56 thereby forming an induced bleed channel 80 running along the seam to provide a conduit for rapid evacuation of the air within the space or vacuum chamber 32 inside the peripheral seal 34 when the vacuum pump 48 is energized. Each induced bleed channel 80 comprises three different portions or segments 80-1, 80-2 and 80-3 and each segment is in parallel with the others forming a set of three along each seam 56 as shown in FIGS. 10 and 10a.

A first segment 80-1 of each bleed channel set 80 comprises a thin space or area formed between the pre-sensitized film sheet 24 and the planar surface 28 of the rigid glass plate 26 thereby providing a plurality of separate interior pathways for the escape for any air entrapped between these faces of the member when a vacuum is drawn through the ports 40 immediately after the peripheral seal 34 has been established. A second segment 80-2 of each bleed channel set 80 comprises a thin space or region formed between adjacent faces of the pre-sensitized film 24 and the image master sheet 22. A third portion 80-3 of each bleed channel set 80 comprises a space formed between the adjacent surfaces of the flexible inner vacuum blanket 30 and the pre-sensitized film sheet 24. It will thus be seen that these momentarily formed, induced bleed channel sets 80 provide for a rapid evacuation of the air within the interior area of the vacuum blanket 20 even though the surrounding peripheral seal 34 is first established after the vacuum pump is energized to commence an operating cycle.

Because the vacuum ports 40 are closely adjacent the outer periphery of the vacuum blanket 30, whenever the vacuum pump 48 is in operation, an airtight seal is generally first established around the peripheral sealing area 34 and any existing air between the inner blanket 30, the rigid exposure plate 26, the pre-sensitized film sheet 24 and the image master sheet 22 would tend to become entrapped between the film sheets for a considerable period of time during the evacuating process. Entrapped air pockets would render poor registration and copy quality if not eliminated by means of the momentarily established, induced bleed channel sets 80. The bleed channel sets 80 serve to remove this air very rapidly as indicated by the dotted arrow paths B as shown in FIG. 2.

In order to insure that air from the bleed channels 80 in the central portions of the blanket 20 can rapidly reach the vacuum ports 40 at the corners of the blanket, a flow strip 82 formed of relatively thick, flexible elastomeric material is provided on the inside face of the inner blanket 30 within the peripheral seal 34 and along one edge of the blanket extending transversely of the bleed passages 80 adjacent the end of the seams 56. The flow strip 82 as shown in FIGS. 2, 6, 7 and 8 is provided with a plurality of diamond-shaped indentations 84 on an inner face thereof which confronts the planar surface 28 of the rigid exposure plate 26. These diamond-shaped indentations provide a myriad of diverse air passages for directing the escaping air from each of the plurality of induced bleed channel sets 80 toward the corner vacuum ports 40 whenever that the vacuum pump 48 is energized.

Referring now to FIG. 11, a source of AC electrical power is connected through a power switch 86 having a control handle 88 to an electric motor driven vacuum pump 48. Electrical power is also supplied to a power input terminal on an adjustable interval timer relay 90 having a control for interval adjustment with a knob 92 for setting up a desired timing interval for operating the pressure pump 78. A vacuum switch 94 is also supplied with electrical power and this switch senses the amount of vacuum present in the vacuum line 50 which is connected to the vacuum ports 40. For example, during an operating cycle of the vacuum blanket 20, when a vacuum of approximately ten inches of mercury is sensed, the vacuum switch 94 closes to send a control input signal through a line 96 to the timer 90 which, in turn, then supplies a power output signal through a line 98 to energize the electric motor driven pressure pump 78. When the pump is operating, the plurality of air pressure chambers 60 are inflated via a line 76 connected to the pressure ports 70 in the bladder sheet 52. A positive inflation pressure of 3 to 5 psi is maintained for a selected interval of time, for example, ten seconds as set by the interval adjustment knob 92 on the timer 90, and at the end of the time period, the pressure pump 78 is deenergized and the pressure line 76 is vented to atmosphere. When this occurs, the induced bleed channels 80 are collapsed or deflated by atmospheric pressure acting on the outer surface of the bladder sheet 52.

When the air chambers 60 collapse, the previously induced bleed channel sets 80 substantially disappear (FIG. 10b) and the film sheets 22, 24 and inner blanket 30 are flattened against the planar surface 28 of the rigid exposure plate 26. When these members are flattened out by atmospheric pressure the channel sets 80 running along the seams 56 as illustrated in FIG. 10b are eliminated and precision registry between the pre-sensitized film sheet 24 and a film master image sheet 22 is assured. After a time period of light exposure has been completed, the vacuum pump 48 is deenergized and the vacuum blanket 20 which is no longer forced against the rigid plate 26 by atmospheric pressure can be readily moved away so that the film sheets 22 and 24 can be removed.

The parallel seams 56 of the blanket 20 may be formed by heat sealing such as radio frequency heat sealing, mechanical heat sealing, vulcanizing or using a suitable cement that is compatible with the coating materials of the inner blanket 30, the bladder 52 and the outer batten pocket forming sheet 62. The seal 54 and seams 56 can be rapidly formed by a heat sealing and/or vulcanizing process wherein the respective sheets are secured together along the seal and seams all at one time and by using a catalytically cured sealant material if the sheet materials involved, comprise a vinyl or urethane coated fabric. It is desirable that the laminated sheets be capable of withstanding an inflation pressure of 3 to 5 psi in the inflatable air chambers 60 without any separation of the sheets at the seams 56, after many repetitions of inflation and deflation. A peel away strength of adhesion along the seams 56 should be at least approximately thirty pounds per lineal inch of seam. If heat sealing or using an adhesive along the seams 56 is not alone strong enough to withstand this range of operating pressure, separation between the inner blanket 30, the bladder sheet 52 and outer batten sheet 62 may sometimes occur after many repetitions during operation. To prevent any inadvertent separation of the sheets 30, 52 and 62 along the seams 56, rows of stitching 100 may be provided along each seam to further reinforce and secure the adhesion between the sheets. When stitching is utilized, a suitable airtight sealant is also used to close any needle holes that are formed by the stitching operation and which might remain in the adhesive material along the seams 56 and in the adhering sheets.

In a prototype vacuum blanket 20 constructed in accordance with the present invention, the seams 56 formed a plurality of bleed channel sets 80 having a maximum width of approximately 0.06" or less and a depth between the sheets or layers estimated to be in the range of 0.001" to 0.002". The momentary induced bleed channels 80 are extremely effective in rapidly reducing the time interval required for fully evacuating all air pockets between the sheets as the vacuum blanket 20 is biased against the rigid glass plate 26 during a normal operating cycle. In a typical operating cycle, after approximately ten psi of vacuum pressure is reached in the line 50 connected to the vacuum ports 40, the air chambers 60 are then pressurized to approximately 3 to 5 psi for a selectively adjustable time period, for example, about ten seconds, and thereafter the inflation pressure is released to collapse the air chambers during the light exposure period. The results achieved with this mode of operation have been outstanding in terms of copy quality and the reduced time required for a complete operating cycle of the vacuum blanket 20.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. A vacuum blanket for holding a sensitive sheet of material in precise registration with a master sheet against a rigid plate, comprising;
   a blanket of thin flexible sheet material having at least one vacuum port therein and an inside face opposing said rigid plate and adapted for biasing said sensitive sheet and said master sheet toward said rigid plate;
   a flexible perimeter seal around the edges of said blanket for sealing off a vacuum chamber established between said blanket and said plate when air is withdrawn through said vacuum port;
   a bladder of thin flexible sheet material secured to an outer surface of said blanket at spaced apart seams forming a plurality of separate, inflatable air chambers on the outside of said blanket; and
   at least one inflation port in said bladder for directing air to inflate said air chambers and thereby create a plurality of bleed passages along said seams by movement, of said blanket away from said rigid plate for rapidly evacuating the space between said sheets and said rigid plate when air is withdrawn from said vacuum chamber through said vacuum port.

2. The vacuum blanket of claim 1, including;
an outer sheet of thin flexible material secured to an outside face of said bladder along said seams forming a plurality of batten pockets; and a relatively stiff batten in each of said pockets for minimizing outward deflection of said bladder between said seams when said air chambers are inflated.

3. The vacuum blanket of claim 1, wherein;
said seams are parallel and have opposite ends spaced inwardly of said perimeter seal; and
elongated spacer means between said blanket and said bladder transversely of said seams adjacent ends thereof for providing a flow passage for air withdrawn from said bleed passages to flow toward said vacuum port.

4. The vacuum blanket of claim 3, wherein;
said spacer means is formed of flexible sheet material having voids therein forming said flow passage.

5. The vacuum blanket of claim 1 including;
stitching means along said seams for securing said blanket and said bladder together.

6. The vacuum blanket of claim 2, including;
stitching means along said seams for securing said blanket, said bladder and said outer sheet together.

7. The vacuum blanket of claim 1, in combination with;
vacuum pump means having an air inlet in communication with said vacuum port on said blanket and an outlet in communication with said inflation port on said bladder for inflating said air chambers when a vacuum is drawn on said vacuum chamber by operation of said pump member.

8. The vacuum blanket combination of claim 7, further including
diverter valve means in communication with said inflation port and said outlet of said pump means for venting air from said pump means and said inflation port in a first position and connecting said outlet of said pump means to said inflation port in a second position.

9. The vacuum blanket combination of claim 8, further including;
control means for said pump means and said diverter valve means for moving said diverter valve means to said first position after said pump means has been energized for a selected time period.

10. The vacuum blanket combination of claim 9, wherein;
said control means includes timer means for activating said diverter valve means to move between said first and second positions at selected time intervals.

11. A vacuum blanket for holding a sensitive sheet of material in precise registration with a master sheet against a rigid plate, comprising;
blanket means of thin, flexible, elastomeric sheet material for pressing said sheets toward said rigid plate;
vacuum port means on said blanket for withdrawing air from between said blanket means and said rigid plate;
perimeter seal means around the edges of said blanket means for sealing against the ingress of outside air between said blanket means and rigid plate when air is withdrawn through said vacuum port means;
bladder means of thin, flexible, elastomeric sheet material secured to said blanket means on a side opposite said rigid plate;
sealing means around the periphery of said bladder means for sealing by securing the same to said blanket means to form an air inflatable bladder;
divider means in said bladder forming a plurality of separate air inflation cells separated by and comprising elongated seams of attachment between said blanket means and bladder means; and
inflation port means on said bladder means for inflating said cells causing said blanket means to move away from said rigid plate along said seams of attachment thereby forming bleed passages for air between said blanket means and rigid plate to move toward said vacuum port.

12. The vacuum blanket of claim 11, including;
stiffening means for limiting outward movement of said bladder means between said elongated seams of attachment.

13. The vacuum blanket of claim 12, wherein;
said stiffening means includes battens formed of relatively stiff material mounted in position against said bladder means, and
means for maintaining said battens in said position as said cells are inflated.

14. The vacuum blanket of claim 13, wherein;
said means for maintaining said battens in said position comprises a sheet of thin flexible plastic material secured to said bladder along said seams of attachment forming elongated pockets for said battens.

15. The vacuum blanket of claim 13 wherein said battens are formed of aluminum.

16. The vacuum blanket of claim 11, wherein;
said elongated seams of attachment are parallel and terminate at opposite ends spaced inside said sealing means around the periphery of said bladder means.

17. The vacuum blanket of claim 16, including ;
passage forming means extending transversely of said elongated seams for directing air from said bleed passages toward said vacuum port means when air is withdrawn therethrough.

18. The vacuum blanket of claim 17, wherein;
said passage forming means comprises an elongated strip of flexible sheet material secured to said blanket means and including voids therein for permitting air flow between said bleed passages and said vacuum port means.

19. The vacuum blanket of claim 1, wherein;
said seams are strengthened by stitching means between said blanket means and said bladder means.

20. The vacuum blanket of claim 1, wherein;
said seams are formed by adhesive means between said blanket means and said bladder means.

21. The vacuum blanket of claim 1, wherein:
said seams are formed by heat sealing means.

22. The vacuum blanket of claim 1, wherein:
said perimeter seal is formed by heat sealing means.

23. The vacuum blanket of claim 21, wherein:
said heat sealing means is provided by the application of radio-frequency along said seams.

24. The blanket of claim 21, wherein:
said heat sealing means is provided by vulcanizing said blanket and bladder along said seams.

* * * * *

UNITED STATES PATENT AND TRADEMARK OFFICE
CERTIFICATE OF CORRECTION

PATENT NO. : 4,935,773

DATED : Jun. 19, 1990

INVENTOR(S) : G. B. Kirby Meacham

It is certified that error appears in the above-identified patent and that said Letters Patent is hereby corrected as shown below:

On the title page, item [73], "Honeywell Inc., Minneapolis, Minn." should read --nuArc Company, Inc., Niles, Illinois--; and Attorney, Agent, or Firm -"Roger W. Jensen" should read --Mason, Kolehmainen, Rathburn & Wyss--.

Signed and Sealed this

Twenty-second Day of January, 1991

*Attest:*

HARRY F. MANBECK, JR.

*Attesting Officer*

*Commissioner of Patents and Trademarks*